United States Patent
Tokumaru

(10) Patent No.: US 8,268,401 B2
(45) Date of Patent: Sep. 18, 2012

(54) METHOD FOR PRODUCING CERAMIC HONEYCOMB STRUCTURE

(75) Inventor: Shinya Tokumaru, Miyako-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 400 days.

(21) Appl. No.: 12/593,251

(22) PCT Filed: Mar. 19, 2008

(86) PCT No.: PCT/JP2008/055142
§ 371 (c)(1),
(2), (4) Date: Sep. 25, 2009

(87) PCT Pub. No.: WO2008/117729
PCT Pub. Date: Oct. 2, 2008

(65) Prior Publication Data
US 2010/0086696 A1    Apr. 8, 2010

(30) Foreign Application Priority Data
Mar. 26, 2007    (JP) .................................. 2007-079506

(51) Int. Cl.
*B05D 3/12* (2006.01)
*B28B 19/00* (2006.01)

(52) U.S. Cl. ........ 427/356; 118/100; 118/200; 264/630; 264/631; 427/375

(58) Field of Classification Search .................. 118/100, 118/200; 264/628, 629, 630, 631; 427/355, 427/356, 375
See application file for complete search history.

(56) References Cited

U.S. PATENT DOCUMENTS

2006/0210822 A1* 9/2006 Ono .............................. 428/593
2009/0136710 A1* 5/2009 Ichikawa ...................... 428/117

FOREIGN PATENT DOCUMENTS

| JP | 05-269388 A | 10/1993 |
| JP | 2002-166404 A | 6/2002 |
| JP | 2006-159571 A | 6/2006 |
| WO | 2007/148764 A1 | 12/2007 |

* cited by examiner

*Primary Examiner* — Michael Cleveland
*Assistant Examiner* — Alexander Weddle
(74) *Attorney, Agent, or Firm* — Sughrue Mion, PLLC

(57) ABSTRACT

A method for producing a ceramic honeycomb structure comprising applying a coating material to an outer peripheral surface of the ceramic honeycomb body to form an outer peripheral wall, the thickness of the coating material applied being determined from the outer diameter of the ceramic honeycomb body and the drying shrinkage ratio of the coating material, such that the outer diameter of the dried ceramic honeycomb structure is within a target outer size±1.4 mm.

3 Claims, 4 Drawing Sheets

METHOD FOR PRODUCING CERAMIC HONEYCOMB STRUCTURE

FIELD OF THE INVENTION

The present invention relates to a method for producing a ceramic honeycomb structure, particularly to a method for producing a ceramic honeycomb structure by forming an outer peripheral wall on an outer peripheral surface of the ceramic honeycomb body.

BACKGROUND OF THE INVENTION

To reduce harmful substance contained in exhaust gases discharged from engines of automobiles, etc. for the protection of regional and global environment, exhaust-gas-cleaning catalytic converters and particulate-matter-capturing ceramic honeycomb filters comprising ceramic honeycomb structures are used.

As shown in FIG. 2, a conventional ceramic honeycomb structure 20 comprises large numbers of flow paths 14 defined by perpendicularly crossing cell walls 13 and an outer peripheral wall 21, usually having a substantially circular or elliptical vertical cross section in a flow path direction. The outer peripheral wall 21 of the ceramic honeycomb structure 20 is held by a grip member (not shown) formed by a metal mesh, a ceramic mat, etc. in a metal container (not shown).

The ceramic honeycomb structure 20 is produced by the steps of (1) mixing and blending starting materials comprising ceramic materials such as cordierite powder, a molding aid, a pore-forming material, etc. with water to prepare a moldable ceramic material, (2) extruding the moldable ceramic material through a honeycomb-shaped die to produce a green ceramic honeycomb body integrally comprising an outer peripheral wall 21 and cell walls 13, and (3) drying and sintering the green body. Such steps provides a ceramic honeycomb structure 20 having predetermined shape and strength, with cell walls 13 having fine pores.

Used for filters for cleaning exhaust gases from diesel engines may be large ceramic honeycomb structures 20 of 150 mm or more in outer diameter Da and 150 mm or more in length L with cell walls 13 as thin as 0.2 mm or less, in FIG. 2. In the production of such large ceramic honeycomb structures 20 with thin cell walls, green ceramic honeycomb bodies obtained by extruding moldable ceramic materials have such insufficient strength that they are likely deformed with cell walls 13 in edge portions of their outer peripheral walls 21 crushed by their own weight. The sintering of deformed green bodies would not provide ceramic honeycomb structures 20 with predetermined strength.

To solve this problem, as shown in FIGS. 3(a) and 3(b), JP 5-269388 A discloses a honeycomb structure 10 obtained by filling a coating material comprising cordierite particles and/or ceramic fibers and colloidal oxide (colloidal silica, colloidal alumina, etc.) as main components in grooves 15 of cells 14a on an outer peripheral surface, among large numbers of cells 14 defined by cell walls 13, and drying or sintering it to form an outer peripheral wall 12 having a thickness T on a ceramic honeycomb body 11, such that the honeycomb structure 10 has an outer diameter Dd. JP 5-269388 A describes that the outer peripheral wall 12 reinforces an outer peripheral surface 11a, thereby providing the honeycomb structure 10 with excellent heat resistance and thermal shock resistance.

JP 2002-166404 A proposes a method for producing a ceramic honeycomb structure 10 having a uniform outer size, comprising applying a coating material to an outer peripheral surface 11a of ceramic honeycomb body 11, from which a peripheral portion is removed by machining, using an apparatus shown in FIG. 4(a), and drying the resultant coating to an outer peripheral wall 12. The apparatus shown in FIG. 4(a) comprises a pair of center members 42 for sandwiching center portions of both end surfaces 15a, 15b of the ceramic honeycomb body 11, and a pair of outer members 41 each surrounding the center member 42 for sandwiching outer portions of both end surfaces 15a, 15b. Each center member 42 comprises a planar support plate 42a and a shaft member 42c fixed to the support plate 42a, and each outer member 41 comprises a flat, hollow support plate 41a, a hollow shaft member 41c fixed to this support plate 41a, and a portion 41b having an outer diameter Dc larger than the outer diameter Db of the outer peripheral surface 11a of the ceramic honeycomb body 11 for abutting a scraper 43. The method described in JP 2002-166404 A comprises sandwiching both end surfaces 15a, 15b of the ceramic honeycomb bodies 11 with the support plates 41a, 42a, abutting the scraper 43 to the portion 41b, rotating the shaft members 41c, 42c filling a coating material in a gap defined by the outer peripheral surface 11a of ceramic honeycomb body 11, the support plates 41 and the scraper 43, and drying the coating material applied to the outer peripheral surface to form the outer peripheral wall 12 shown in FIG. 4(b). This reference describes that by providing each sandwiching member with a two-part structure comprising the center member 42 and the outer member 41, the sandwiching members can easily be detached from the ceramic honeycomb body 11 to which the coating material is applied.

However, the outer diameter of the dried outer peripheral walls 12 formed by the methods described in JP 5-269388 A and JP 2002-166404 A is smaller than the target outer diameter of the ceramic honeycomb structure 10, because the coating material shrinks due to the evaporation of water by drying. Accordingly, the ceramic honeycomb structure 10 is shaken in a metal container during use, resulting in the likelihood of breakage.

Particularly when a peripheral portion is removed from the ceramic honeycomb body 11 by machining as described in JP 2002-166404 A, the volume of notches should be increased so that broken peripheral portions and deformed cell walls 13, if any, can be removed. Accordingly, The outer diameter Db [see FIG. 4(a)] before forming the outer peripheral wall 12 may differ from one ceramic honeycomb body 11 to another. Further, when sintering is conducted after removing the peripheral portion from the ceramic honeycomb body 11 by machining, the outer diameter of the ceramic honeycomb body 11 differs more due to expansion and shrinkage in sintering.

Thus, when a coating material is applied to the outer peripheral surfaces 11a of ceramic honeycomb bodies 11 having different outer diameters Db, using support plates of a constant size as shown in FIG. 4(a), coatings 12c having different thicknesses Tc are formed on ceramic honeycomb bodies 11. Different thicknesses of the coatings 12c result in difference drying shrinkage degrees, failing to provide ceramic honeycomb structures 10 having constant outer diameters Dd after drying. Particularly when the outer diameter of the honeycomb structure 10 is smaller than the target size, the ceramic honeycomb structure 10 is shaken in a metal container during use, resulting in the likelihood of breakage.

In addition, a coating material cannot fully be applied to the outer peripheral surface 11a of the ceramic honeycomb body 11 near the end surfaces 15a, 15b by the methods of JP 5-269388 A and JP 2002-166404 A, gaps 17 are generated in boundaries 16 between the outer peripheral surface 11a of the dried ceramic honeycomb structure 10 and the resultant coating 12c as shown in FIG. 4(b), so that the outer peripheral wall 12 is easily cracked.

OBJECT OF THE INVENTION

Accordingly, an object of the present invention is to provide a method for forming an outer peripheral wall such that the outer diameter of the resultant ceramic honeycomb structure is equal to a target size, thereby reducing unevenness in the outer diameter. It further prevents gaps from generating in boundaries between the outer peripheral surface of the ceramic honeycomb body and the coating near both end surfaces, thereby preventing the cracking of the outer peripheral wall.

DISCLOSURE OF THE INVENTION

Taking into consideration the shrinkage ratio of a coating material during drying, the inventors have found that it is possible to provide the formed outer peripheral wall with a proper thickness by adjusting the thickness of a coating material applied depending on ceramic honeycomb bodies, thereby providing the ceramic honeycomb structure with a constant outer diameter, and that by making the outer peripheral wall longitudinally longer than the ceramic honeycomb body, the outer peripheral wall can be formed without gaps in boundaries between the outer peripheral surface and the coating. The present invention has been completed based on such finding.

Thus, the method of the present invention for producing a ceramic honeycomb structure comprises applying a coating material to an outer peripheral surface of the ceramic honeycomb body to form an outer peripheral wall, the thickness of the coating material applied being determined from the outer diameter of the ceramic honeycomb body and the drying shrinkage ratio of the coating material, such that the outer diameter of the dried ceramic honeycomb structure is within a target outer size±1.4 mm.

The thickness of the coating material is preferably adjusted by a gap between the outer peripheral surface of the ceramic honeycomb body and a scraper disposed outside the ceramic honeycomb body.

The coating material is preferably applied to the outer peripheral surface and edge portions of end surfaces of the ceramic honeycomb body, to form the outer peripheral wall such that the longitudinal length of the outer peripheral wall is larger than that of the ceramic honeycomb body by 1.4 to 4 times the thickness of the coating material, and to form the end edge walls on the edge portions of end surfaces of the ceramic honeycomb body such that the end edge walls are as wide as 1.2-6 times the thickness of the coating material.

Another method of the present invention for producing a ceramic honeycomb structure having an outer peripheral wall and end edge walls comprising applying a coating material to the outer peripheral surface and edge portions of end surfaces of the ceramic honeycomb body, to form the outer peripheral wall such that the longitudinal length of the outer peripheral wall is larger than that of the ceramic honeycomb body by 1.4 to 4 times the thickness of the coating material, and to form the end edge walls on the edge portions of end surfaces of the ceramic honeycomb body such that the end edge walls are as wide as 1.2-6 times the thickness of the coating material.

The outer peripheral wall formed longitudinally longer than the ceramic honeycomb body and the end edge walls formed on the edge portions of end surfaces of the ceramic honeycomb body preferably are removed to the same plane as each end surface of the ceramic honeycomb body after drying.

DESCRIPTION OF THE PREFERRED EMBODIMENTS

Figure 1A:
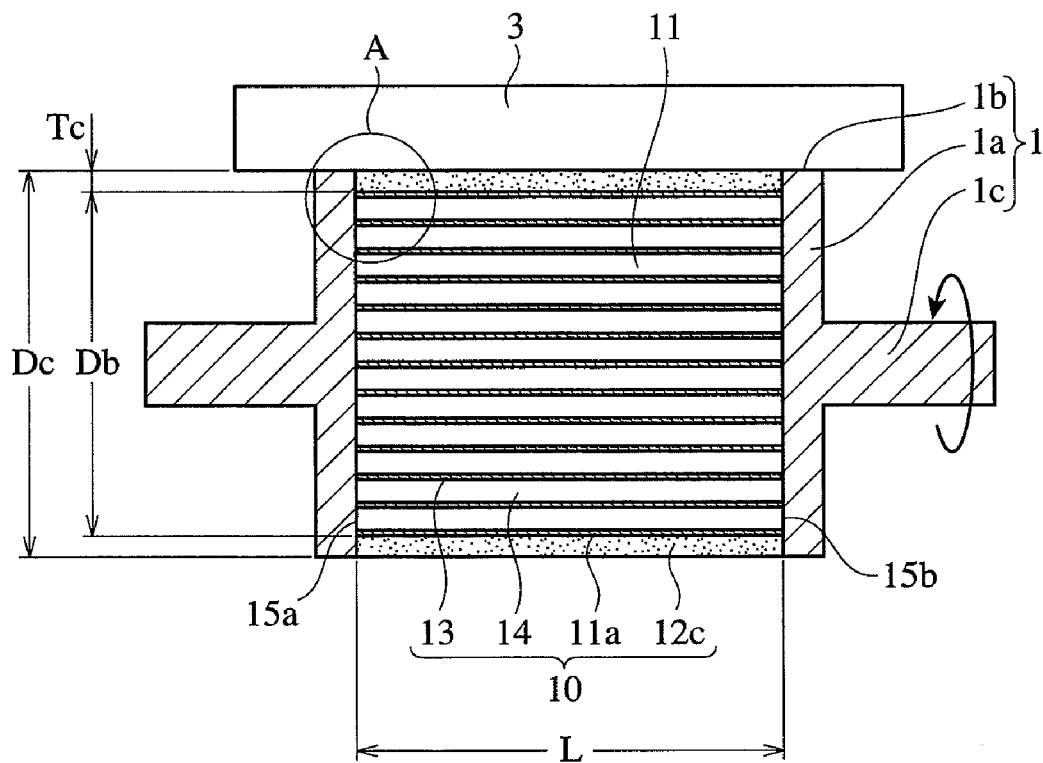
FIG. 1(a) is a schematic cross-sectional view showing an apparatus for applying a coating material to a ceramic honeycomb body, which is used in the production method of the present invention.
Figure 1B:
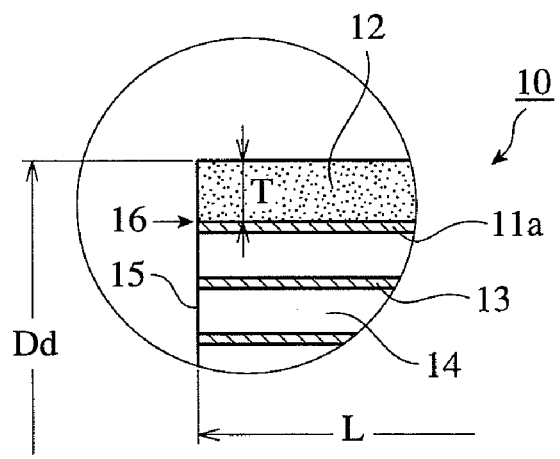
FIG. 1(b) is an enlarged cross-sectional view showing a portion A of the ceramic honeycomb structure shown in FIG. 1(a).

[1] Production Method of Ceramic Honeycomb Structure

The method of the present invention for producing a ceramic honeycomb structure comprises applying a coating material to an outer peripheral surface of the ceramic honeycomb body to form an outer peripheral wall, the thickness of the coating material applied being determined from the outer diameter of the ceramic honeycomb body and the drying shrinkage ratio of the coating material, such that the dried ceramic honeycomb structure has a target outer size.

When a coating material is applied to an outer peripheral surface 11a of each of ceramic honeycomb bodies 11 having different outer diameters Db to form an outer peripheral wall 12, the thickness Tc of the coating material applied should be changed depending on the ceramic honeycomb bodies 11 to provide the applied and dried ceramic honeycomb structure 10 with an outer diameter set to a predetermined target size $Dd_0$. For instance, when the outer diameter Db and target size $Dd_0$ of the ceramic honeycomb body 11 have large difference, the thickness Tc of the resultant coating 12c is increased. When the outer diameter Db and target size $Dd_0$ of the ceramic honeycomb body 11 have small difference, the thickness Tc of the coating 12c is reduced.

When dried, the applied coating material shrinks by the evaporation of water. Accordingly, if the coatings 12c had different thicknesses Tc as described above, the dried outer peripheral walls 12 would have different thicknesses T because of different drying shrinkage, resulting in different outer diameters Dd from one ceramic honeycomb body 10 to another. If the outer diameter Dd were larger than the target size $Dd_0$, the outer peripheral wall 12 of the ceramic honeycomb structure 10 would likely be subjected to excess pressure when received in a metal container, resulting in cracking. If the outer diameter Dd were smaller than the target size $Dd_0$, the ceramic honeycomb structure 10 would likely be shaken in a metal container during use, resulting in breakage.

Thus, when a coating material is applied to a ceramic honeycomb body 11 having an outer diameter Db, the thickness Tc of the coating material is determined taking into consideration the drying shrinkage ratio of the coating material, such that the ceramic honeycomb structure has a target size $Dd_0$ after drying. Because the coating material shrinks by drying as described above, shrinkage should be taken into consideration to make the thickness Tc of the coating material applied larger than T, wherein T is the thickness of the dried outer peripheral wall, which corresponds to one-half of the difference between the outer diameter Db and target size $Dd_0$ of the ceramic honeycomb body 11. When the coating material has a shrinkage ratio S, the thickness Tc of the coating material is $T \times [1/(1-S)]$ to form an outer peripheral wall having thickness T. With the outer peripheral wall 12 formed by such method, the ceramic honeycomb structure 10 can have reduced unevenness in outer diameter. The difference between the target size $Dd_0$ and the final outer diameter Dd of the ceramic honeycomb structure is preferably from −1.4 mm to +1.4 mm.

It is preferable to measure in advance the shrinkage ratio of a coating material applied to an outer peripheral surface 11a of the ceramic honeycomb body 11 and dried. Because the drying shrinkage ratio differs from ceramic material lots to another for the coating material, the drying shrinkage ratio is more preferably measured on each starting material lot. The drying shrinkage ratio of the coating material is determined by (Tc−T)/Tc, wherein Tc is the thickness of coating material applied, and T is the thickness of the dried outer peripheral wall 12.

The thickness of a coating material applied is preferably adjusted by a gap between the outer peripheral surface of the ceramic honeycomb body 11 and a scraper 3 disposed outside the ceramic honeycomb body 11. As shown in FIG. 1(a), with both end surfaces 15a, 15b of the ceramic honeycomb body 11 sandwiched by support plates 1, whose abutting portions 1b are in contact with a scraper 3, a coating material is applied to the outer peripheral surface 11a of the ceramic honeycomb body 11, such that gaps defined by the outer peripheral surface 11a of the ceramic honeycomb body 11, the support plates 1 and the scraper 3 are filled with the coating material. The thickness of the resultant coating 12c, which is determined by distance between the outer peripheral surface 11a of the ceramic honeycomb body 11 and the scraper 3, can be adjusted by using support plates 1 having different diameters.

Figure 4A:
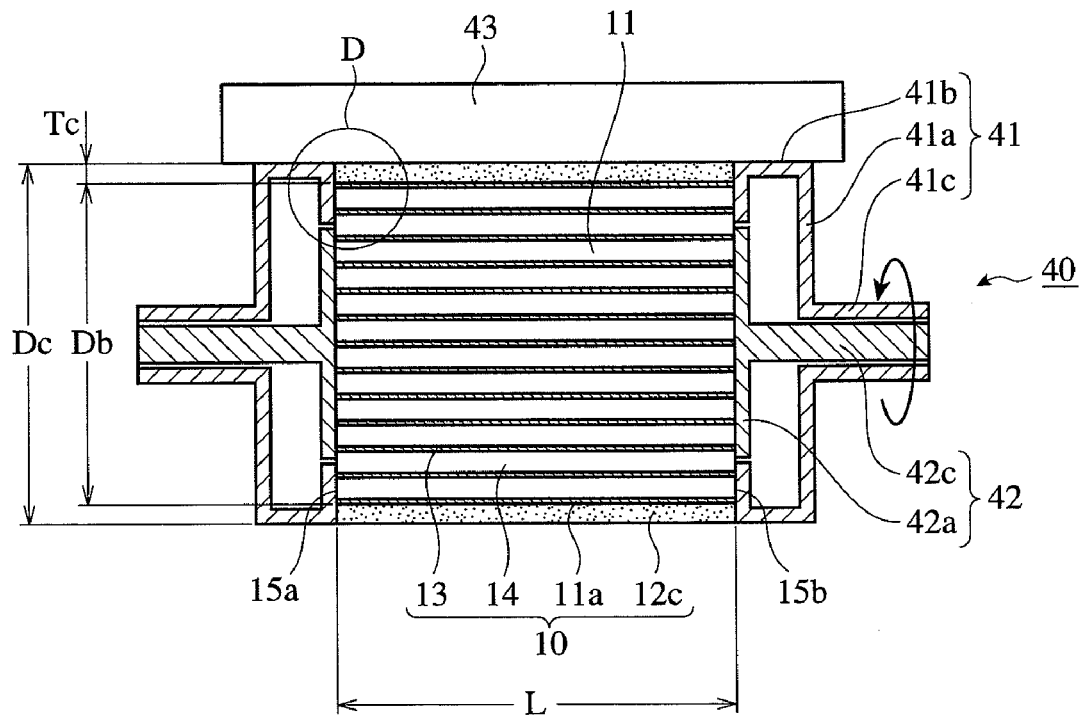
FIG. 4(a) is a cross-sectional view showing the apparatus for applying a coating material to a ceramic honeycomb body, which is described in JP 2002-166404 A.
Figure 4B:
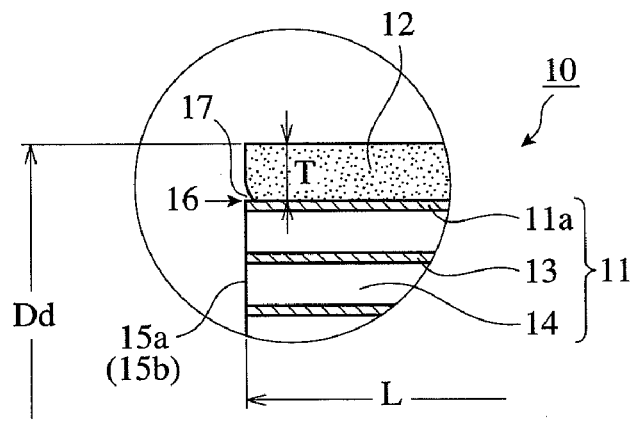
FIG. 4(b) is an enlarged cross-sectional view showing a portion D of the ceramic honeycomb structure shown in FIG. 4(a).

A coating material is preferably applied not only to the outer peripheral surface 11a of the ceramic honeycomb body 11 but also to edge portions of the end surfaces 15a, 15b, thereby forming an outer peripheral wall 12 longitudinally longer than the ceramic honeycomb body 11, and end edge walls 18 on edge portions of the end surfaces 15a, 15b of the ceramic honeycomb body 11. As shown in FIG. 4(b), with end edge walls 18 formed on edge portions of the end surfaces 15a, 15b of the ceramic honeycomb body 11, gaps 17 are not generated in boundaries 16 between the outer peripheral surface 11a near the end surfaces 15a, 15b and the resultant coating 12c, thereby preventing the cracking of the outer peripheral wall 12 by shock, etc. The end edge walls 18 are preferably removed from the end surfaces 15a, 15b after drying, thereby providing a ceramic honeycomb structure 10 without gaps 17 in boundaries 16 between the outer peripheral surface 11a near the end surfaces 15a, 15b of the ceramic honeycomb body 11 and the resultant coating 12c.

Figure 1C:
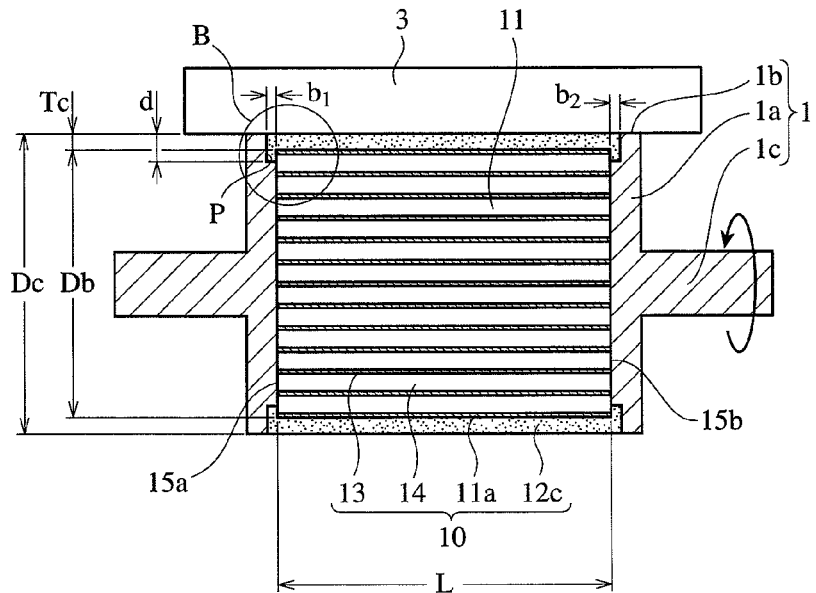
FIG. 1(c) is a schematic cross-sectional view showing an apparatus for applying a coating material to a ceramic honeycomb body, which is used in another production method of the present invention.
Figure 1D:
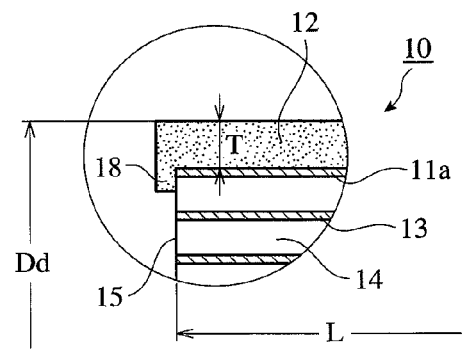
FIG. 1(d) is an enlarged cross-sectional view showing a portion B of the ceramic honeycomb structure shown in FIG. 1(c).
Figure 1E:
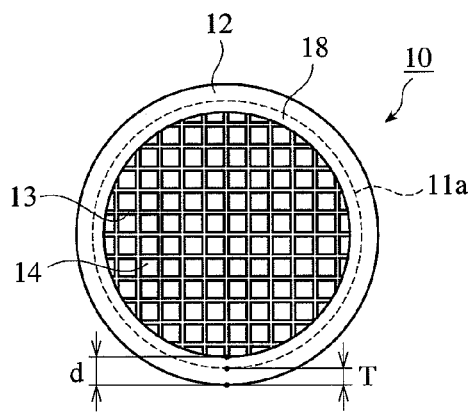
FIG. 1(e) is a front view showing an end surface of the ceramic honeycomb structure shown in FIG. 1(c).
Figure 2:
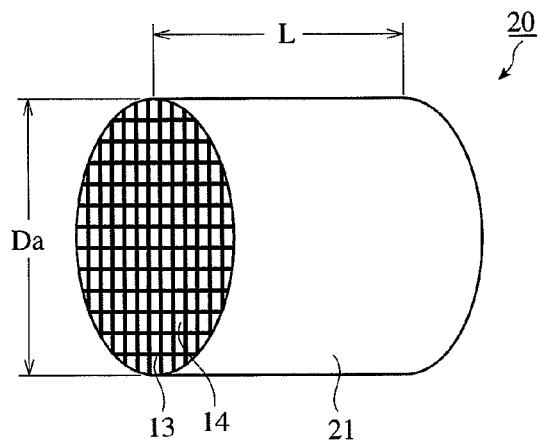
FIG. 2 is a perspective view showing a conventional ceramic honeycomb structure.
Figure 3A:
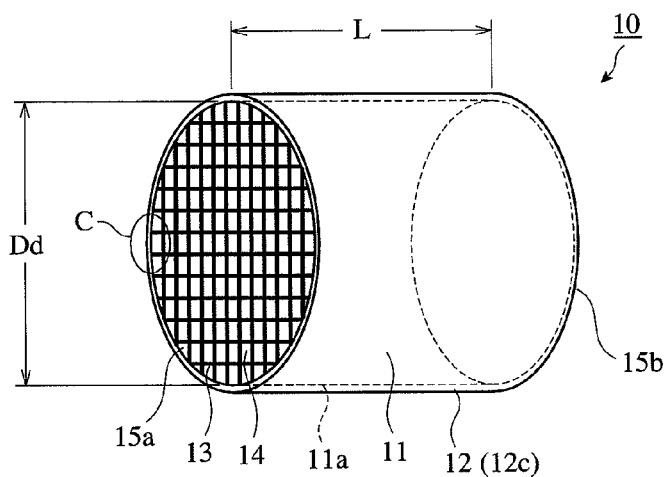
FIG. 3(a) is a perspective view showing the ceramic honeycomb structure described in JP 5-269388 A.
Figure 3B:
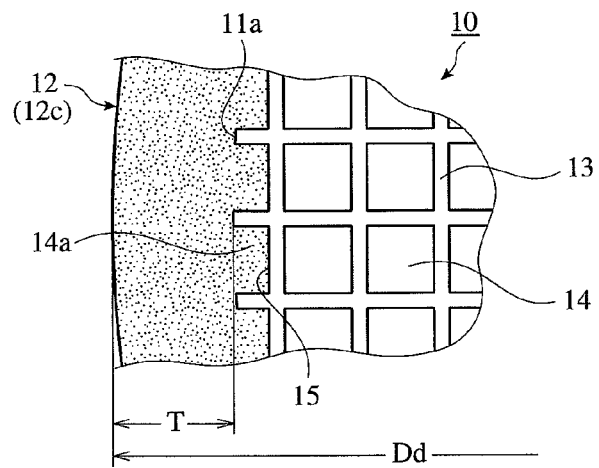
FIG. 3(b) is an enlarged front view showing the portion C in FIG. 3(a).

In FIG. 1(c), the difference ($b_1+b_2$) between the longitudinal length of the outer peripheral wall 12 and the longitudinal length L of the ceramic honeycomb body 11 is preferably 1.4 to 4 times the thickness Tc of the coating material applied. The width d of the end edge walls 18 formed on the edge portions of the end surfaces 15a, 15b of the ceramic honeycomb body 11 is preferably 1.2-6 times the thickness Tc of the coating material applied. With the end edge walls 18 formed in such shape, gaps 17 can be effectively prevented from generating in boundaries 16 between the outer peripheral surface 11a near end surfaces 15a, 15b of the ceramic honeycomb body 11 and the resultant coating 12c.

When the difference ($b_1+b_2$) is less than 1.4 times the thickness Tc of the coating material applied, the end edge walls 18 are too thin, resulting in gaps 17 generated during drying in boundaries 16 between the outer peripheral surface 11a and the resultant coating 12c, making it likely that the outer peripheral wall 12 are cracked. On the other hand, when the difference ($b_1+b_2$) exceeds 4 times the thickness Tc, an excess coating material applied to the edge portions of the end surfaces 15a, 15b should be removed. The difference ($b_1+b_2$) is more preferably 1.4-3.5 times, further preferably 1.4-3 times, the thickness Tc of the coating material applied.

When the width d of the end edge walls 18 is less than 1.2 times the thickness Tc of the coating material applied, gaps tend to be formed in boundaries 16 between the outer peripheral surface 11a and the resultant coating 12c, making it likely that the outer peripheral wall 12 are cracked. On the other hand, when the width d of the end edge walls 18 exceeds 6 times the thickness Tc, part of cells 14 are clogged by the coating material applied to the edge portions of the end surfaces 15a, 15b. The width d of the end edge walls 18 are more preferably 1.5-5 times, further preferably 1.7-4 times, the thickness Tc of the coating material applied.

As shown in FIG. 1(c), notches P in portions 1b of the support plates 1 abutting the scraper 3 are filled with the coating material, so that the coating material are applied to the end surfaces 15a, 15b of the ceramic honeycomb body 11. By drying the coating material charged into the notches P, as shown in FIG. 4(d), the end edge walls 18 are formed on the edge portions of the end surfaces 15a, 15b of the ceramic honeycomb body 11. The end edge walls 18 are preferably removed from the end surfaces 15a, 15b after drying.

The notches P preferably have widths $b_1$, $b_2$ and the width d, which are 0.7-2 times and 1.2-6 times, respectively, the thickness Tc of the resultant coating 12c. Because such size permits the coating material applied to fully fill the notches P, gaps can be prevented from generating in boundaries 16 between the outer peripheral surface 11a of the ceramic honeycomb body 11 and the resultant coating 12c, resulting in a ceramic honeycomb structure 10 having a cracking-resistant outer peripheral wall 12.

When the widths $b_1$, $b_2$ of the notches P are less than 0.7 times the thickness Tc of the resultant coating 12c, a coating material is not easily applied to the edge portions of the end surfaces 15a, 15b of the ceramic honeycomb body 11, resulting in gaps formed in boundaries 16 between the outer peripheral surface 11a and the resultant coating 12c. When the widths $b_1$, $b_2$ of the notches P exceed 2 times the thickness Tc of the coating material applied, an excess coating material applied to the edge portions of the end surfaces 15a, 15b should be removed.

When the width d of the notches P is less than 1.2 times the thickness Tc of the coating material applied, a coating material is not easily applied to the edge portions of the end surfaces 15a, 15b of the ceramic honeycomb body 11, resulting in gaps formed in boundaries between the outer peripheral surface 11a and the resultant coating 12c. When the width d of the notches P exceeds 6 times the thickness Tc of the coating material applied, part of cells are clogged by a coating material applied to the edge portions of the end surfaces 15a, 15b.

The viscosity of the coating material is preferably 20 Pa·s or more. The coating material having a viscosity of 20 Pa·s or more can form an outer peripheral wall 12 and end edge walls 18 having high strength. When the viscosity of the coating material is less than 20 Pa·s, a coating material applied to the outer peripheral surface 11a of the ceramic honeycomb body 11 and charged into the notches P flows down, failing to form an outer peripheral wall 12 and end edge walls 18. The viscosity is more preferably 100 Pa·s or more. Because a coating material with too high viscosity cannot easily be applied to the outer peripheral surface 11a of the ceramic honeycomb body 11 by a scraper, the viscosity is preferably 500 Pa·s or less.

The coating material preferably comprises 10-15 parts by mass on a solid basis of colloidal silica based on 100 parts by mass of cordierite powder having an average particle size of 10 μm, and further 0.5-2 parts by mass of methylcellulose based on 100 parts by mass in total of the cordierite powder and the colloidal silica, and is blended with water to a viscosity of 20 Pa·s or more.

Cordierite-forming material powder forming a green ceramic honeycomb body preferably comprises 48-52% by mass of $SiO_2$, 33-37% by mass of $Al_2O_3$, and 12-15% by mass of MgO.

The present invention will be explained in further detail by Examples below without intention of restricting the present invention thereto.

EXAMPLE 1

(1) Formation of Ceramic Honeycomb Body

Kaolin powder, talc powder, silica powder, alumina powder, etc. were mixed to prepare cordierite-forming material powder comprising 50% by mass of $SiO_2$, 35% by mass of $Al_2O_3$ and 13% by mass of MgO, which was dry-mixed with methylcellulose, hydroxypropyl methylcellulose, etc. as binders, a lubricant, a pore-forming material such as graphite, etc. Thereafter, blending was conducted with water added to prepare a plasticized moldable ceramic material. This moldable ceramic material was extrusion-molded, cut to a predetermined length, and dried to obtain a green honeycomb body of cordierite ceramic having a honeycomb structure integrally comprising a peripheral portion and cell walls 13. This green ceramic honeycomb body had an outer diameter of 280 mm and a longitudinal length L of 300 mm, with cell walls 13 having thickness of 0.2 mm and cell pitch of 1.5 mm. After the peripheral portion was removed from this green body by a cylindrical grinding machine, the green body was sintered to obtain a ceramic honeycomb body 11 having an outer diameter Db of 264 mm.

(2) Preparation of Coating Material 100 parts by mass of cordierite powder having an average particle size of 10 μm was mixed with 12 parts by mass of colloidal silica on a solid basis, and 100 parts by mass in total of mixed cordierite powder and colloidal silica was mixed with 1.2 parts by mass of methylcellulose, and blended together with water to have a viscosity adjusted to 150 Pa·s, thereby preparing a coating material.

A coating material was applied to a thickness Tc to an outer peripheral surface 11a of the ceramic honeycomb body 11 to measure the dry thickness T of the resultant outer peripheral wall 12, and the drying shrinkage ratio S of the coating material was determined by (Tc−T)/Tc. When the coating material was dried, the shrinkage ratio S was 0.3.

(3) Coating of Coating Material

With a target size $Dd_0$ of the ceramic honeycomb structure 10 set to 267 mm, a coating material was applied to an outer peripheral surface 11a of this ceramic honeycomb body 11 by a coating apparatus shown in FIG. 1(a). This coating apparatus comprises support plates 1 each having a sandwiching portion 1a for sandwiching both end surfaces 15a, 15b of the ceramic honeycomb body 11, an abutting portion 1b to which a scraper 3 abuts, and a rotatable shaft 1c, and a scraper 3. The thickness Tc of the coating material can be adjusted by changing the outer diameter Dc of the abutting portion 1b of each support plate 1 depending on the outer diameter Db of the ceramic honeycomb body 11. Prepared in this Example were four types of support plates 1, whose abutting portions had outer diameters Dc of 276.0 mm, 269.0 mm, 268.0 mm and 267.0 mm, respectively.

The thickness Tc of the coating material applied was determined from the outer diameter Db (264 mm) of the ceramic honeycomb body 11 and the drying shrinkage ratio S (0.3) of the coating material, by the formula of $Tc=(Dd_0-Db)\times 0.5/(1-S)$, and a proper support plate 1 was selected such that the outer diameter Dd became within a target size $Dd_0 \pm 1.4$ mm. A support plate 1 having an outer diameter of 276.0 mm was used in Example 1.

Using the above support plates 1 each having a sandwiching portion 1a for sandwiching both end surfaces 15a, 15b of the ceramic honeycomb body 11, and an abutting portion 1b for abutting the scraper 3, a coating material was applied to the outer peripheral surface 11a while rotating the rotatable shaft 1c. The coating material applied was dried to obtain a ceramic honeycomb structure 10 provided with an outer peripheral wall 12.

(4) Evaluation

The outer diameter Dd of the dried coating material was measured to determine difference between this outer diameter Dd and the target size $Dd_0$. Further evaluated were the cracking of the outer peripheral wall when this ceramic honeycomb structure was received in a metal container, and the breakage of the ceramic honeycomb structure due to vibration in the metal container during operation.

The evaluation of cracking in the outer peripheral wall when the ceramic honeycomb structure was held in the metal container was conducted by observing by the naked eye cracking at one end of the outer peripheral wall 12, after the ceramic honeycomb structure 10 was once gripped and inserted into a cylinder resembling the metal container. The test was conducted on three honeycomb structures and evaluated by the following standard.

Good No cracking at all in any of three honeycomb structures.
Fair At least one of three honeycomb structures had cracks of less than 0.5 mm.
Poor At least one of three honeycomb structures had cracks of 0.5 mm or more.

A ceramic honeycomb structure subjected to a vibration test of applying vibration of 100 Hz with acceleration of 60 G for 100 hours in the metal container was observed by the naked eye, and its breakage during use was evaluated by the following standard.

Good No breakage.
Fair With breakage of less than 1 mm.
Poor With breakage of 1 mm or more.
The total evaluation was as follows.
Good Any of the above evaluations were Good.
Fair Either one of the above evaluations was Fair.
Poor Either one of the above evaluations was Poor.

EXAMPLES 2-7

The thickness of a peripheral portion removed by machining was changed, and ceramic honeycomb bodies 11 having different outer diameters Db as shown in Table 1 were produced in the same manner as in Example 1. Ceramic honeycomb structures 10 were produced by applying a coating material to an outer peripheral surface 11a of each of these ceramic honeycomb bodies 11 to form an outer peripheral wall 12 in the same manner as in Example 1, except for using support plates having outer diameters Dc shown in Table 1. The same evaluation as in Example 1 was conducted on the resultant ceramic honeycomb structures 10.

COMPARATIVE EXAMPLES 1-3

The thickness of a peripheral portion removed by machining was changed as shown in Table 1, and ceramic honeycomb bodies 11 having different outer diameters Db as shown in Table 1 were produced in the same manner as in Example 1. Without taking into account the outer diameter Db of the ceramic honeycomb body 11 and the drying shrinkage ratio of the coating material, ceramic honeycomb structures 10 were produced by applying a coating material to an outer peripheral surface 11a of each of the ceramic honeycomb bodies 11 to form an outer peripheral wall 12 in the same manner as in Example 1, except for using support plates with abutting portions each having the same outer diameter Dc as the target size $Dd_0$ (Comparative Examples 1 and 2) and a support plate deviated from the target size (Comparative Example 3). The same evaluation as in Example 1 was conducted on the resultant ceramic honeycomb structures 10.

All of these results are shown in Table 1.

TABLE 1

| No. | $Db^{(1)}$ (mm) | $Dc^{(2)}$ (mm) | $Tc^{(3)}$ (mm) |
| --- | --- | --- | --- |
| Example 1 | 264.0 | 267.0 | 1.5 |
| Example 2 | 266.0 | 267.0 | 0.5 |
| Example 3 | 264.0 | 268.0 | 2.0 |
| Example 4 | 266.0 | 268.0 | 1.0 |
| Example 5 | 260.0 | 269.0 | 4.5 |
| Example 6 | 264.0 | 269.0 | 2.5 |
| Example 7 | 250.5 | 276.0 | 12.8 |
| Comparative Example 1 | 260.0 | 267.0 | 3.5 |
| Comparative Example 2 | 262.0 | 267.0 | 2.5 |
| Comparative Example 3 | 260.0 | 276.0 | 8.0 |

Note:
$^{(1)}$The outer diameter of the ceramic honeycomb body.
$^{(2)}$The outer diameter of abutting portions of a support plate.
$^{(3)}$The thickness of the coating material applied.

| No. | $Dd^{(1)}$ (mm) | $Dd - Dd_0^{(2)}$ (mm) | Cracking | Breakage | Total Evaluation |
| --- | --- | --- | --- | --- | --- |
| Example 1 | 266.1 | −0.9 | Good | Good | Good |
| Example 2 | 266.7 | −0.3 | Good | Good | Good |

TABLE 1-continued

| Example 3 | 266.8 | −0.2 | Good | Good | Good |
| --- | --- | --- | --- | --- | --- |
| Example 4 | 267.4 | 0.4 | Good | Good | Good |
| Example 5 | 266.3 | −0.7 | Good | Good | Good |
| Example 6 | 267.5 | 0.5 | Good | Good | Good |
| Example 7 | 268.4 | 1.4 | Fair | Good | Fair |
| Comparative Example 1 | 264.9 | −2.1 | Good | Poor | Poor |
| Comparative Example 2 | 265.5 | −1.5 | Good | Poor | Poor |
| Comparative Example 3 | 271.2 | 4.2 | Poor | Good | Poor |

Note:
$^{(1)}$The outer diameter after drying.
$^{(2)}$The difference between the outer diameter Dd and the target size $Dd_0$.

It is clear from Table 1 that each ceramic honeycomb structure of Examples 1-7 had small unevenness in outer diameter, was resistant to cracking in the outer peripheral wall when received in a metal container, and also resistant to breakage due to vibration during use in a metal container, because the thickness of the coating material applied was determined from the outer diameter of the ceramic honeycomb body and the drying shrinkage ratio of the coating material. On the other hand, those of Comparative Examples 1-3 had large unevenness in outer diameter, and were easily broken in a metal container by vibration during use, because the coating material was applied without considering the outer diameter Db of the ceramic honeycomb body and the drying shrinkage ratio of the coating material.

EXAMPLE 8

A ceramic honeycomb structure 10 provided with an outer peripheral wall 12 was produced in the same manner as in Example 1, except that a coating material was applied by an apparatus shown in FIG. 1(c). This coating apparatus was the same as the apparatus shown in FIG. 1(a) used in Example 1, except that a portion 1b of each support plate 1 abutting a scraper 3 was provided with a notch P, in which a coating material was filled. These notches P had a total width ($b_1+b_2$) of 8 mm, wherein $b_1=b_2$, and a width d of 8 mm. A support plate with abutting portions each having an outer diameter Dc of 269 mm was selected based on the thickness Tc of the resultant coating 12c obtained in the same manner as in Example 1. After drying the coating material, an end edge wall 18 formed on an edge portion of each end surface of the ceramic honeycomb body 11 was removed by grinding to produce a ceramic honeycomb structure 10 having an outer peripheral wall 12.

EXAMPLES 9-13 AND COMPARATIVE EXAMPLES 4-6

Changing the thickness of a peripheral portion removed by machining, ceramic honeycomb bodies 11 having different outer diameters Db as shown in Table 2 were produced in the same manner as in Example 1. Ceramic honeycomb structures 10 provided with outer peripheral walls 12 were produced in the same manner as in Example 8, except that the outer diameter Dc of abutting portions of a support plate was selected as shown in Table 2 such that the difference (Dd−$Dd_0$) between the outer diameter Dd and the target size $Dd_0$ was within a range from −1.4 mm to 1.4 mm in Examples 9-13 and Comparative Examples 4 and 5, and outside a range from −1.4 mm to 1.4 mm in Comparative Example 6, and that the total width ($b_1+b_2$), wherein $b_1=b_2$, and the width d of the notches P were changed as shown in Table 2.

The ceramic honeycomb structures 10 of Examples 8-13 and Comparative Examples 4-6 were measured with respect to the outer diameter Dd of the dried coating material in the same manner as in Example 1, to obtain difference between this outer diameter Dd and the target size $Dd_0$. Gaps 17 [see FIG. 4(b)] in boundaries between the outer peripheral surface 11a and the resultant coating 12c were evaluated by the following standard.

Good No gaps.
Fair Having gaps of less than 0.5 mm.
Poor Having gaps of 0.5 mm or more.

These results are shown in Table 2.

TABLE 2

| No. | Db[1] (mm) | Dc[2] (mm) | Tc[3] (mm) |
|---|---|---|---|
| Example 8 | 260.0 | 269.0 | 4.5 |
| Example 9 | 262.0 | 269.0 | 3.5 |
| Example 10 | 264.0 | 269.0 | 2.5 |
| Example 11 | 266.0 | 269.0 | 1.5 |
| Example 12 | 264.0 | 268.0 | 2.0 |
| Example 13 | 266.0 | 268.0 | 1.0 |
| Comparative Example 4 | 266.0 | 269.0 | 1.5 |
| Comparative Example 5 | 266.0 | 268.0 | 1.0 |
| Comparative Example 6 | 264.0 | 276.0 | 6.0 |

Note:
[1]The outer diameter of the ceramic honeycomb body.
[2]The outer diameter of abutting portions of a support plate.
[3]The thickness of the coating material applied.

| No. | Width $b_1+b_2$ (mm) | Width d (mm) | Gaps P $(b_1+b_2)/Tc$ | d/Tc |
|---|---|---|---|---|
| Example 8 | 8 | 8 | 1.8 | 1.8 |
| Example 9 | 5 | 6 | 1.4 | 1.7 |
| Example 10 | 5 | 6 | 2.0 | 2.4 |
| Example 11 | 5 | 6 | 3.3 | 4.0 |
| Example 12 | 3 | 4 | 1.5 | 2.0 |
| Example 13 | 3 | 4 | 3.0 | 4.0 |
| Comparative Example 4 | 1.5 | 1.5 | 1.0 | 1.0 |
| Comparative Example 5 | 1 | 1 | 1.0 | 1.0 |
| Comparative Example 6 | 8 | 8 | 1.3 | 1.3 |

| No. | Dd[1] (mm) | Dd − $Dd_0$[2] (mm) | Gaps |
|---|---|---|---|
| Example 8 | 266.3 | −0.7 | Good |
| Example 9 | 266.9 | −0.1 | Good |
| Example 10 | 267.5 | 0.5 | Good |
| Example 11 | 268.1 | 1.1 | Good |
| Example 12 | 266.8 | −0.2 | Good |
| Example 13 | 267.4 | 0.4 | Good |
| Comparative Example 4 | 268.1 | 1.1 | Poor |
| Comparative Example 5 | 267.4 | 0.4 | Poor |
| Comparative Example 6 | 272.4 | 5.4 | Poor |

Note:
[1]The outer diameter after drying.
[2]The difference between the outer diameter Dd and the target size $Dd_0$.

As is clear from Table 2, there were no gaps 17 in boundaries between the outer peripheral surface 11a and the resultant coating 12c in Examples 8-13, because a coating material was applied in a thickness determined from the outer diameter of the ceramic honeycomb body size and the drying shrinkage ratio of the coating material, and the coating material was also applied to edge portions of end surfaces of the ceramic honeycomb body in a predetermined thickness.

EXAMPLES 14-16

Changing the thickness of a peripheral portion removed by machining, ceramic honeycomb bodies 11 having different outer diameters Db as shown in Table 3 were produced in the same manner as in Example 1. A coating material was applied to an outer peripheral surface 11a of each of these ceramic honeycomb bodies 11 and dried, in the same manner as in Example 8 except for changing the outer diameter Dc of abutting portions, the total width $(b_1+b_2)$, wherein $b_1=b_2$, and the width d of the notches P as shown in Table 3. Thereafter, end edge walls 18 formed on edge portions of end surfaces of the ceramic honeycomb bodies 11 were removed by grinding, to produce ceramic honeycomb structures 10 provided with outer peripheral walls 12.

With respect to the resultant ceramic honeycomb structures 10 of Examples 14-16, the outer diameters Dd of the dried coating materials were measured in the same manner as in Example 1 to determine differences between the outer diameters Dd and the target size $Dd_0$. Further, gaps 17 [see FIG. 4(b)] in boundaries between the outer peripheral surface 11a and the resultant coating 12c were evaluated in the same manner as in Example 8.

TABLE 3

| No. | Db[1] (mm) | Dc[2] (mm) | Tc[3] (mm) |
|---|---|---|---|
| Example 14 | 268.0 | 269.0 | 0.5 |
| Example 15 | 260.0 | 267.0 | 3.5 |
| Example 16 | 261.0 | 267.0 | 3.0. |

Note:
[1]The outer diameter of the ceramic honeycomb body.
[2]The outer diameter of abutting portions of a support plate.
[3]The thickness of the coating material applied

| No. | Width $b_1+b_2$ (mm) | Width d (mm) | Gaps P $(b_1+b_2)/Tc$ | d/Tc |
|---|---|---|---|---|
| Example 14 | 1.5 | 1.5 | 3.0 | 3.0 |
| Example 15 | 6 | 5 | 1.7 | 1.4 |
| Example 16 | 5 | 5 | 1.7 | 1.7 |

| No. | Dd[1] (mm) | Dd − $Dd_0$[2] (mm) | Gaps |
|---|---|---|---|
| Example 14 | 268.7 | 1.7 | Good |
| Example 15 | 264.9 | −2.1 | Good |
| Example 16 | 265.2 | −1.8 | Good |

Note:
[1]The outer diameter after drying.
[2]The difference between the outer diameter Dd and the target size $Dd_0$.

As is clear from Table 3, there were no gaps 17 in boundaries between the outer peripheral surface 11a and the resultant coating 12c in Examples 14-16, because a coating material was applied to edge portions of end surfaces of the ceramic honeycomb bodies in a predetermined thickness.

EFFECT OF THE INVENTION

Because the method of the present invention can produce a ceramic honeycomb structure with its outer diameter substantially equal to a target size, the ceramic honeycomb structure is not vibrated in a metal container during use, free from the likelihood of breakage. With no gaps in boundaries between the outer peripheral surface and the coating on both end surfaces of the ceramic honeycomb body, the outer peripheral wall is prevented from cracking due to shock, etc.

What is claimed is:

1. A method for producing a ceramic honeycomb structure comprising applying a coating material to an outer peripheral surface of the ceramic honeycomb body to form an outer peripheral wall, the thickness of the coating material applied being determined from the outer diameter of said ceramic honeycomb body and the drying shrinkage ratio of the coating material, such that the outer diameter of the dried ceramic honeycomb structure is within a target outer size±1.4 mm,
  wherein said coating material is applied to the outer peripheral surface and edge portions of end surfaces of said ceramic honeycomb body, thereby forming said outer peripheral wall such that the longitudinal length of said outer peripheral wall is larger than that of said ceramic honeycomb body by 1.4 to 4 times the thickness of said coating material, and forming end edge walls on edge portions of end surfaces of said ceramic honeycomb body such that the end edge walls are as wide as 1.2-6 times the thickness of said coating material, and
  wherein said outer peripheral wall formed longitudinally longer than said ceramic honeycomb body and said end edge walls formed on the edge portions of end surfaces of said ceramic honeycomb body are removed to the same plane as each end surface of said ceramic honeycomb body after drying.

2. The method for producing a ceramic honeycomb structure according to claim 1, wherein the thickness of said coating material is adjusted by a gap between the outer peripheral surface of said ceramic honeycomb body and a scraper disposed outside said ceramic honeycomb body.

3. A method for producing a ceramic honeycomb structure having an outer peripheral wall and end edge walls comprising applying a coating material to the outer peripheral surface and edge portions of end surfaces of said ceramic honeycomb body, to form said outer peripheral wall such that the longitudinal length of said outer peripheral wall is larger than that of said ceramic honeycomb body by 1.4 to 4 times the thickness of said coating material, and to form said end edge walls on the edge portions of end surfaces of said ceramic honeycomb body such that the end edge walls are as wide as 1.2-6 times the thickness of said coating material,
  wherein said outer peripheral wall formed longitudinally longer than said ceramic honeycomb body and said end edge walls formed on the edge portions of end surfaces of said ceramic honeycomb body are removed to the same plane as each end surface of said ceramic honeycomb body after drying.

* * * * *